United States Patent [19]

Beavers

[11] 4,293,862
[45] Oct. 6, 1981

[54] CANOPY ASSEMBLY FOR PATCHED RADAR DOMES

[75] Inventor: Allan E. Beavers, Littleton, Colo.

[73] Assignee: T. A. Pelsue Company, Englewood, Colo.

[21] Appl. No.: 157,019

[22] Filed: Jun. 6, 1980

[51] Int. Cl.³ .................. H01Q 1/42; B32B 35/00
[52] U.S. Cl. ............................. 343/872; 156/94
[58] Field of Search ............ 343/704, 872, 912; 156/94, 95, 97

[56] References Cited

U.S. PATENT DOCUMENTS 2,948,896  8/1960  Hart .................................. 343/912
3,837,965  9/1974  Mahon et al. ....................... 156/94

Primary Examiner—Eli Lieberman
Attorney, Agent, or Firm—Edwin L. Spangler, Jr.

[57] ABSTRACT

This invention relates to a canopy assembly for use in combination with a force-fed supply of hot humidified air to be used in the curing of repair patches on airborne radar domes, such a canopy assembly including a flexible donut-shaped inflatable distributor having an inlet on its outer periphery connectable to the source of air and a plurality of apertures spaced around its inside margin for distributing the air more or less radially inward over the patch, a plurality of tie-down straps encircling the distributor tube spaced around its periphery, a like member of suction cups detachably connectable to the tie-down straps for mounting the tube in encircling relation to the patch to be cured, a flexible shroud of a size and shape effective to cooperate with the distributor to define a protective cover over the patch, and means depending from the margins of the shroud detachably connectable to the strap and suction cup subassemblies for releasably interconnecting same in roof-forming relation atop the distributor.

7 Claims, 7 Drawing Figures

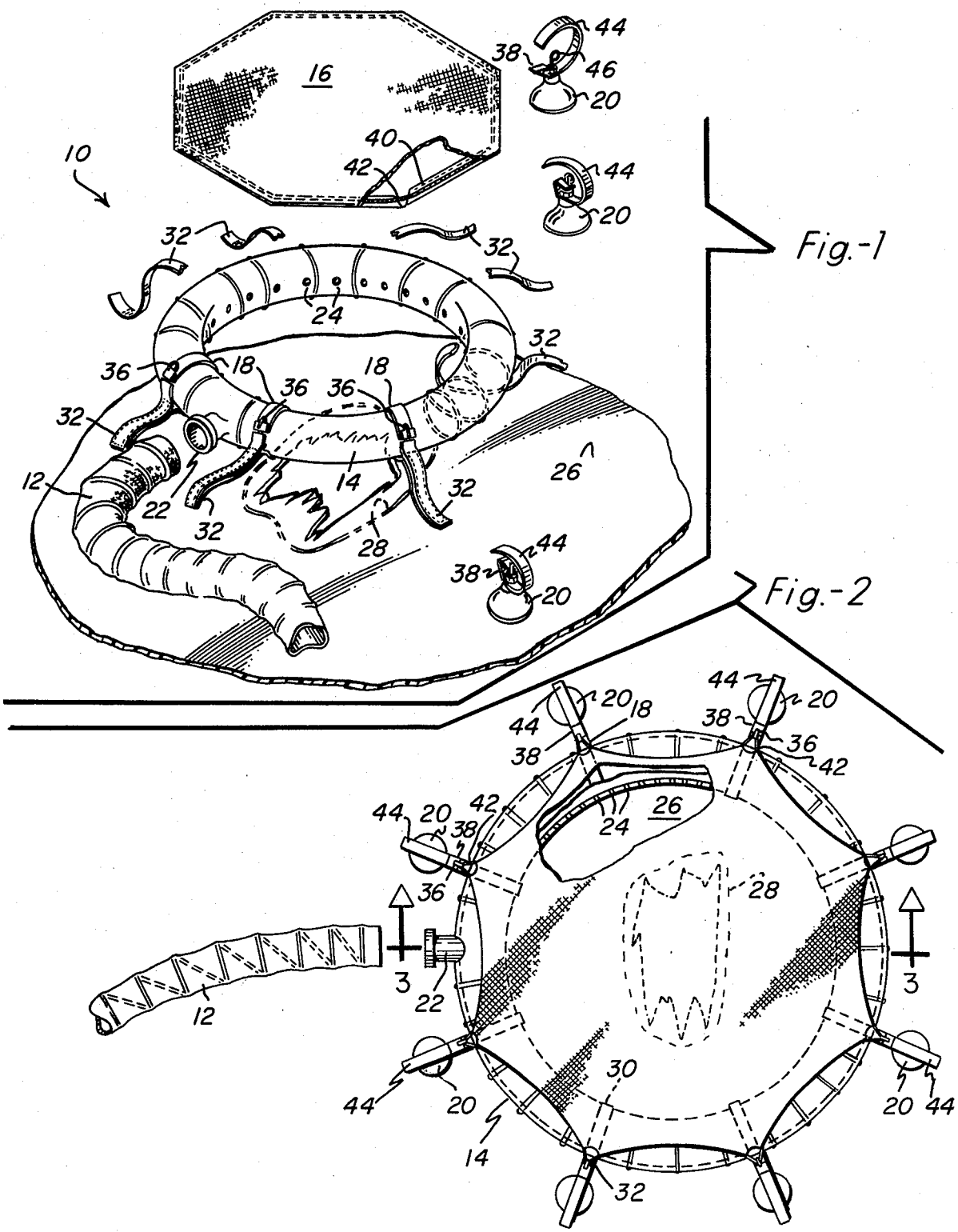

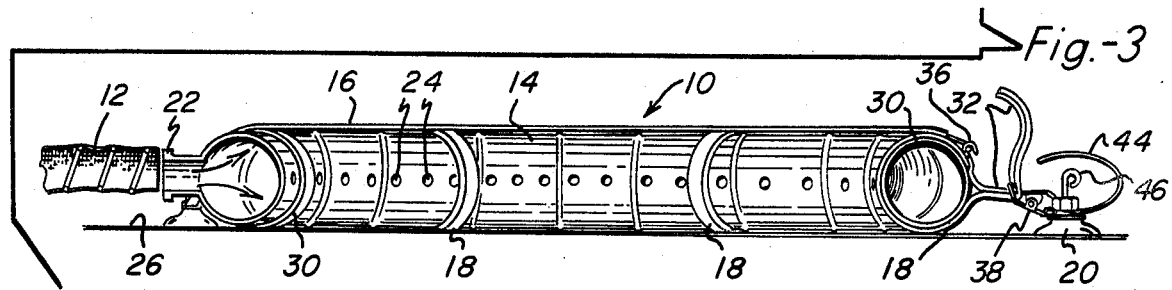
Fig.-3
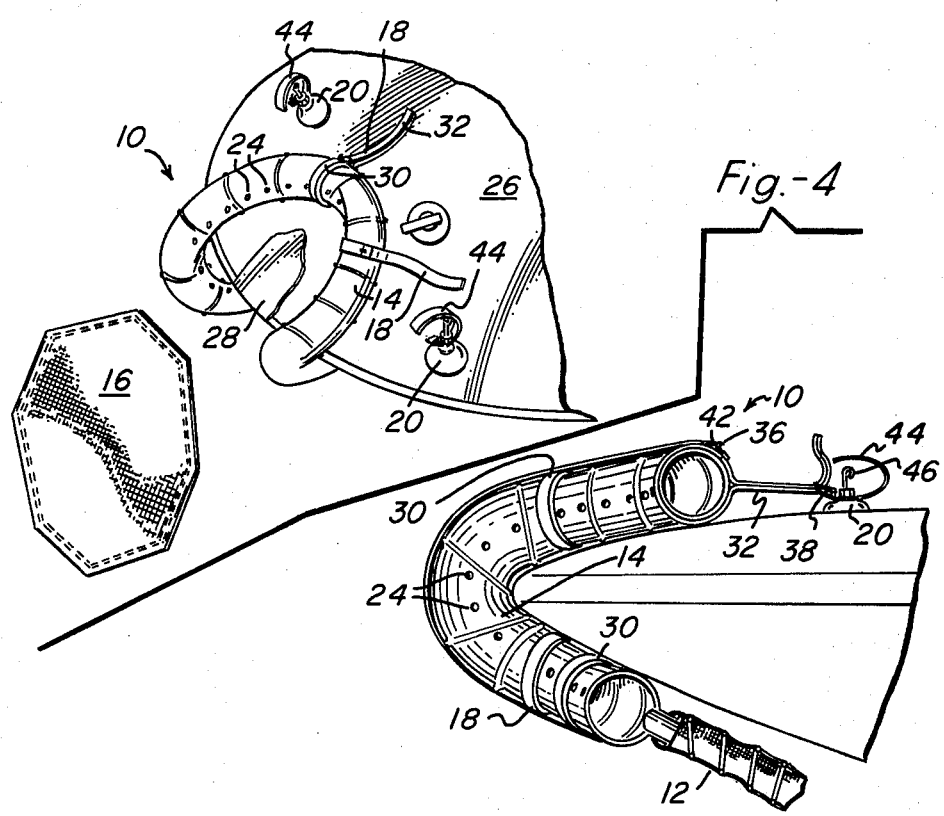
Fig.-4
Fig.-5
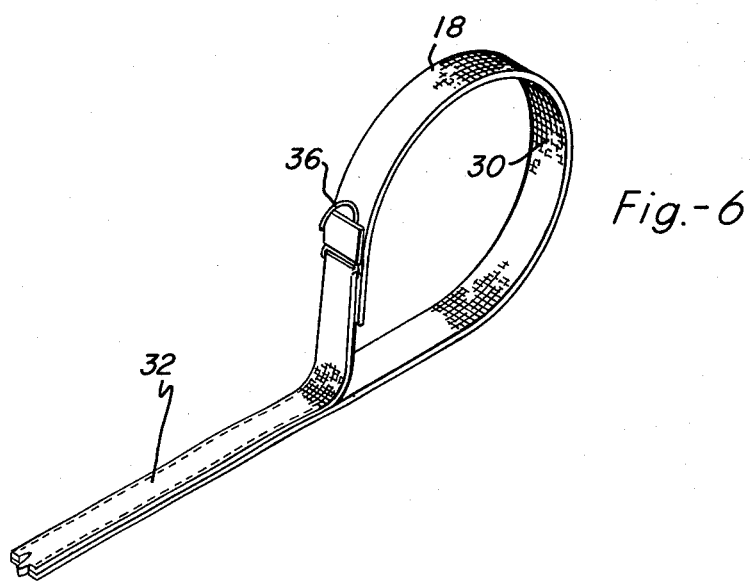
Fig.-6

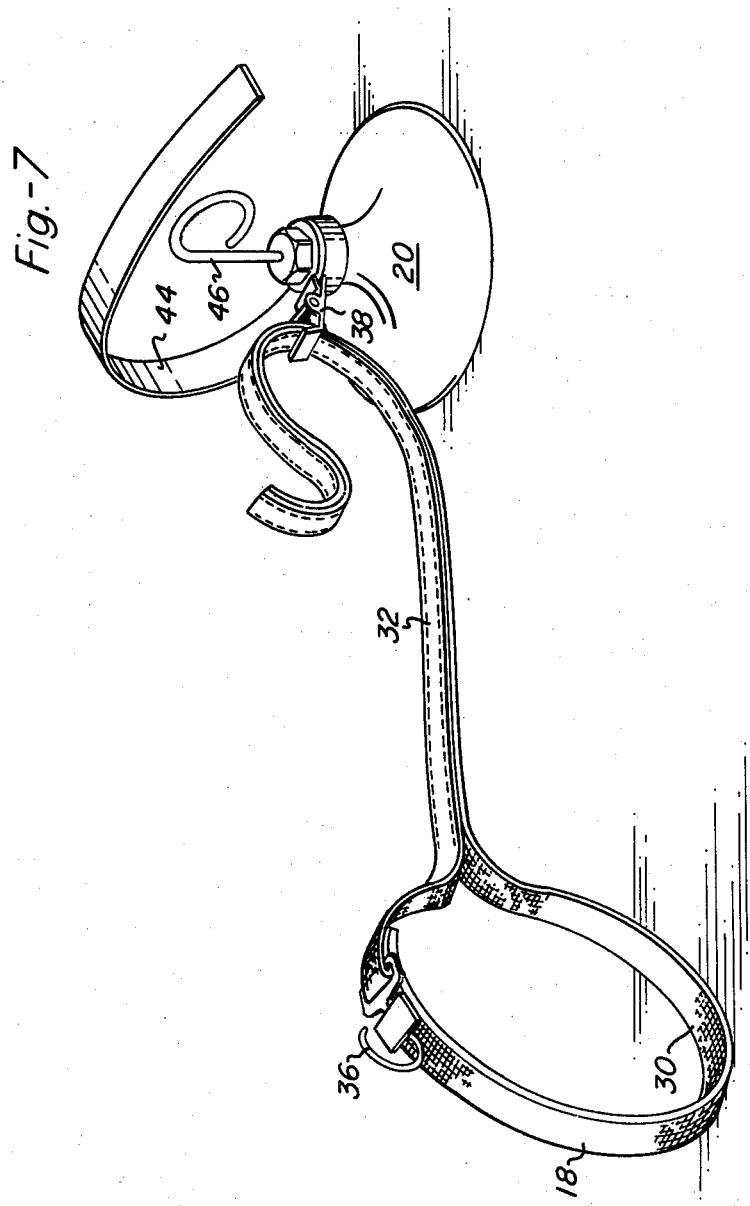

CANOPY ASSEMBLY FOR PATCHED RADAR DOMES

Specially equipped aircraft used in high altitude surveillance are fitted with large radar domes made of fiberglass and costing many thousands of dollars. The integrity of the radar signal is dependent upon the face that the convex surface of these domes is maintained absolutely smooth and essentially perfectly contoured. Unfortunately, from time to time, accidents occur such as hitting birds in flight, which damage this surface and require that it be restored to its original condition.

The dome itself is a lightweight cellular laminate covered with fiberglass that not infrequently requires a patch as large as three feet in diameter to properly repair the damaged area. Once the patch has been applied, a very careful curing operation becomes necessary to complete the repair. It consists of directing a flow of hot air over the patch for an extended period of time, the temperature and humidity of the air being carefully controlled and monitored at its source. Forced air heater blowers capable of supplying hot humidified air of the quality needed for the curing operation are commercially available and, therefore, such units form no part of the present invention. Instead, the instant invention relates to canopy assembly for use in combination with such a supply of forced air that defines a protective cover over the repaired area, directs the air evenly and uniformly across the patch and facilitates periodic inspection of the patch to assess the progress of the curing operation. In addition, the canopy provides an extremely versatile structure that can be fitted to any of the contours of the dome including its edge which means that patches can be effectively cured regardless of where the damaged area occurs.

It is, therefore, the principal object of the present invention to provide a novel canopy assembly for use in combination with a force-fed supply of hot humid air to cure a patch used in the repair of a damaged radar dome.

A second objective is the provision of a device of the type described which is readily adaptable to any contour found on the dome.

Another object is the provision of a temporary protective cover for repaired areas on radar domes that effectively shields the latter from adverse weather conditions during the critical curing operation.

Still another objective is the provision of an inflatable donut-like air distribution sheath which, in association with the shroud covering same and the tie-down subassemblies, defines a roofed-over annular compartment encircling the repaired area which cooperates with the hot humid air introduced therein to create a controlled environment conducive to the curing operation.

An additional object of the invention is to provide a patch covering canopy that includes a removable shroud which can be partially detached from the hold-down subassemblies and lifted free of the air distribution sheath for periodic inspections.

Further objects of the within described invention are to provide a canopy for covering and protecting repaired areas of radar domes that is simple, relatively inexpensive, versatile, easy to use, convenient, lightweight, compact and even somewhat decorative.

Other objects will be in part apparent and in part pointed out specifically hereinafter in connection with the description of the drawings that follows, and in which:

FIG. 1 is an exploded perspective view, portions of which have been broken away to conserve space while others have been similarly treated to better expose the interior construction, showing the air distribution sheath in position to be connected to the source of hot humid air and be lowered into position atop the dome in surrounding relation to the patch, the shroud ready to be lowered onto the sheath in roof-forming relation thereto, and the hold-down subassemblies to detachably fasten the latter in assembled relation atop the convex surface of the dome;

FIG. 2 is a top plan view of the completed assembly to a slightly larger scale than FIG. 1, portions of the shroud having, once again, been broken away and shown in section to more clearly reveal the construction of the sheath;

FIG. 3 is a diametrical section taken along line 3—3 of FIG. 2 and to a still further enlarged scale;

FIG. 4 is an exploded perspective view similar to FIG. 1 and to approximately the same scale but differing therefrom by revealing how the canopy mounts on the edge of the dome in contrast to the top thereof;

FIG. 5 is a diametrical section analogous to FIG. 3 but to a scale more nearly approximating that of FIG. 2 showing the complete assembly in place on the edge of a dome;

FIG. 6 is a perspective view to approximately the same scale as FIG. 6 showing the tie-down strap; and, FIG. 7 is a fragmentary perspective view to approximately the same scale as FIG. 6 showing the subassembly that includes the suction cup and tie-down strap in assembled relation.

Referring next to the drawings for a detailed description of the present invention and, initially, to FIGS. 1–5 for this purpose, reference numeral 10 has been chosen to broadly designate the canopy assembly which is detachably connected to a force-fed source of hot humid air (not shown) that is delivered thereto by a length of large diameter wire-reinforced hose 12. Encompassed within canopy assembly 10 is an inflatable donut-shaped air distribution sheath 14, a shroud 16 that defines a cover therefor, a series of tie-down straps 18 and an equal member of suction cups 20. In the particular form shown, the air distribution sheath or plenum comprises a length of flexible wire-reinforced hose formed into a hollow ring. At some point on its outer periphery, a rigid collar 22 is inserted through an approximately-dimensioned opening provided for the purpose where it is sewn or otherwise fastened permanently in place. This collar is adapted for detachable connection to air delivery hose 12.

Opening toward the center of the ring-like sheath are a series of spaced apertures 24 that receive the hot humid air circulating therein and discharge same inwardly in a more or less radial direction. When the sheath is placed on a convex surface of the dome 26 in encircling relation to a patch 28 that repairs a damaged place thereon, these apertures 24 are so arranged that they direct a series of jets of hot air across the face of the patch for the purpose of curing same.

The hose used to form the sheath is, preferably, of the wire-reinforced variety which will both conform to the contours of the dome including the edge thereof as shown in FIGS. 4 and 5 while, at the same time, maintaining sufficient rigidity to prevent its collapsing under the strain imposed thereon by the tie-down straps 18.

Commercially available wire-wound neoprene hose has proven quite adequate for this particular application because it engages the convex surface of the dome closely enough to shield the patch from external environmental conditions while, at the same time, permitting the air introduced into the center of the ring to escape therebeneath, no air-tight seal being required. In most instances, the sheath will be large enough in circumference to enclose any patch when deployed in circular form, however, in those rare instances where this is not the case, the sheath can be shaped within the limits of the oversize shroud 16 to assume configurations other than purely circular such as, for example, somewhat ovate, elliptical or even polygonal.

Next, with reference to FIGS. 1–6, looped tie-down straps 18 can be seen encircling the sheath at a member of angularly-spaced points throughout its length. Each such strap is loosely looped around the sheath and is adjustable therealong, the diameter of the loop 30 being somewhat oversize in relation to that of the sheath. The straps are each permanently attached to the sheath while remaining totally independent of the shroud for a reason which will be pointed out presently.

In the particular form illustrated, the ends of the strap are sewn together to form double thickness tail 32 terminating in sheath-encircling loop 30. Prior to sewing the ends together to form tail 32, the eye of a hook 36 is slipped over one leg of the strap and sewn in an S-shaped double-folded pleat formed therein so as to end up in loop 30 opening toward the tail and away from the sheath.

The subassembly that includes tie-down strap 18 and suction cup 20 has been shown in detail in FIG. 7 where the two can be seen to have been detachably fastened together by passing the tail 32 of the former through conventional spring buckle 38 carried by the latter. In so doing, the suction cup 20 can be mounted upon any accessible portion of the dome 26 bordering the sheath preparatory to fastening the latter down using the tie-down strap 18, the tail 32 of which is adjustable in length. By repeating this operation all the way around the entire periphery of the sheath, it can be secured in place on the dome in surrounding relation to the patch.

Directing the attention next to FIGS. 2 and 3 in particular, they reveal in detail how the sheath can be fastened to the upwardly-facing convex surface of the dome with the same technique being employed to fasten same to the underside. By way of contrast, FIGS. 4 and 5 show how the same technique is used to secure the sheath in folded condition along an edge of the dome when the repair has to be made at this location. It is important to observe that the sheath and the tie-down subassembly therefore are essentially independent of the shroud 16. The hook 36 attached to the upwardly-facing surface of each tie-down strap constitutes the final link in the complete canopy assembly, the function of which can best be described by returning, once again, to FIGS. 1–5.

The shroud 16 is marginally-hemmed to retain an elastic "bungee" cord 40, portions 42 of which are left exposed at various angularly-spaced points around its periphery, the member of which corresponds to the member of tie-down subassemblies and to their approximate locations. To complete the canopy assembly, one need only lay the shroud over the top of the air distribution sheath and hook the exposed sections 42 of the bungee cord 40 over the hooks 36 carried by the tie-down straps. By so doing, selected sections of the shroud can be disconnected from the tie-down and lifted to examine the progress of the curing operation without having to remove the suction cups or otherwise disturb the sheath.

Finally, once again referring to FIG. 7, each suction cup 20 in the particular form shown will be seen to include an arcuately-curved handle 44 and an eye 46 for the index finger. These appurtenances assist the operation in attaching and removing the suction cup but otherwise are of little significance.

What is claimed is:

1. The canopy assembly for use with a force-fed supply of hot moist air as to cure repair patches on airborne radar domes temporarily housed therebeneath which comprises: a flexible donut-shaped air distribution sheath sized to enclose the repair patch to be cured while conforming in essentially air-tight sealed relation to the contours of the dome surrounding the latter, said sheath having an inlet on its outer surface connectable to the air supply and a plurality of air discharge openings being positioned and adapted to take the hot moist air circulating within the sheath and direct same across the patch so as to define an environment conducive to the curing thereof; anchoring means for temporarily anchoring the air distribution sheath in encircling relation to the patch, said means comprising a plurality of suction cup and strap subassemblies spaced around the sheath, the suction cup of each subassembly being detachably connectable to the surface of the dome while the strap defines a detachable connection between said cup and an adjacent portion of the sheath fastening the latter to said dome; and a shroud defining a loose-fitting protective cover over the sheath capable of permitting the air issuing from the latter to escape therefrom.

2. The radar dome repair patch canopy as set forth in claim 1 wherein the sheath is reinforced to retain its donut-shape when uninflated.

3. The radar dome repair patch canopy as set forth in claim 1 wherein the straps of the anchoring means are looped around the sheath.

4. The radar dome repair patch canopy as set forth in claim 1 wherein the straps of the anchoring means are adjustably buckled to the suction cups thereof.

5. The radar dome repair patch canopy as set forth in claim 1 wherein the shroud is bordered by an elastic cord accessible at points along its periphery adjacent the cup and strap subassemblies of the anchoring means, said accessible portions of the cord being detachably connectable to said adjacent assembly and selectively removable therefrom to permit localized inspection of the patch without having to remove the entire shroud.

6. The radar dome repair patch canopy as set forth in claim 2 wherein the sheath is spirally reinforced to preserve its flexibility both with respect to conforming with the contours of the dome and the shape of the patch to be cured.

7. The radar dome repair patch cover as set forth in claim 5 wherein each of the strap and cup subassemblies of the anchoring means carry a hook for detachably connecting same to the elastic cord bordering the shroud.

* * * * *